(12) United States Patent
Yoshimura et al.

(10) Patent No.: US 12,247,103 B2
(45) Date of Patent: Mar. 11, 2025

(54) POLYIMIDE PRECURSOR SOLUTION, POROUS POLYIMIDE FILM, SEPARATOR FOR SECONDARY BATTERY, AND SECONDARY BATTERY

(71) Applicant: FUJIFILM Business Innovation Corp., Tokyo (JP)

(72) Inventors: Kosaku Yoshimura, Kanagawa (JP); Yasunobu Kashima, Kanagawa (JP); Takahiro Ishizuka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 535 days.

(21) Appl. No.: 17/577,358

(22) Filed: Jan. 17, 2022

(65) Prior Publication Data

US 2023/0079844 A1   Mar. 16, 2023

(30) Foreign Application Priority Data

Sep. 7, 2021   (JP) ................. 2021-145585

(51) Int. Cl.
| | | |
|---|---|---|
| *C08G 73/10* | (2006.01) | |
| *B29C 67/20* | (2006.01) | |
| *H01M 50/403* | (2021.01) | |
| *H01M 50/414* | (2021.01) | |
| *H01M 50/491* | (2021.01) | |
| *B29K 79/00* | (2006.01) | |
| *B29K 105/00* | (2006.01) | |

(52) U.S. Cl.
CPC ........ *C08G 73/1032* (2013.01); *B29C 67/202* (2013.01); *H01M 50/403* (2021.01); *H01M 50/414* (2021.01); *H01M 50/491* (2021.01); *B29K 2079/08* (2013.01); *B29K 2105/0002* (2013.01)

(58) Field of Classification Search
USPC .......................................... 528/322
See application file for complete search history.

(56) References Cited

U.S. PATENT DOCUMENTS

| | | |
|---|---|---|
| 10,930,911 B2 | 2/2021 | Sago et al. |
| 2018/0244886 A1 | 8/2018 | Nukada et al. |
| 2020/0181353 A1 | 6/2020 | Nukada et al. |

FOREIGN PATENT DOCUMENTS

| | | | | |
|---|---|---|---|---|
| JP | 2011132390 | | 7/2011 | |
| JP | 2016183333 A | * | 10/2016 | ........... B29C 67/202 |
| JP | 2017047655 | | 3/2017 | |
| JP | 6342891 | | 6/2018 | |
| JP | 2018138645 | | 9/2018 | |
| JP | 6701834 B2 | * | 5/2020 | ........... B29C 67/202 |
| WO | 2016047360 | | 3/2016 | |

OTHER PUBLICATIONS

JP-6701834-B2 Machine Translation (Year: 2020).*
JP-2016183333-A Machine Translation (Year: 2016).*

* cited by examiner

*Primary Examiner* — Terressa Boykin
(74) *Attorney, Agent, or Firm* — JCIPRNET

(57) ABSTRACT

A polyimide precursor solution includes a polyimide precursor having a glass transition temperature Tg of equal to or higher than 300° C. after imidization, an aqueous solvent containing water, an organic amine compound, and resin particles having a volume average particle size of equal to or less than 100 nm.

17 Claims, 2 Drawing Sheets ial Field

The present invention relates to a polyimide precursor solution, a porous polyimide film, a separator for a secondary battery, and a secondary battery.

(ii) Related Art

JP2017-047655A discloses "a laminate containing a polyimide and/or a polyamide-imide porous film and a polyvinylidene fluoride porous film".

JP2018-138645A discloses "a polyimide precursor solution containing resin particles and a polyimide precursor, in which a volume particle size distribution of the resin particles contained in the polyimide precursor solution has at least one maximum value, and a proportion of a volume frequency of a maximum value at which the volume frequency is the greatest, out of the maximum values, is equal to or more than 90% and equal to or less than 100% with respect to a volume frequency of all the maximum values of the volume particle size distribution, and a method for producing a porous polyimide film using thereof".

SUMMARY

Aspects of non-limiting embodiments of the present disclosure is related to a polyimide precursor solution, a porous polyimide film, a separator for a secondary battery, and a secondary battery, the polyimide precursor solution capable of obtaining a porous polyimide film having sufficient breathability and high heat resistance, and becoming non-breathable or having reduced breathability when the temperature becomes high, compared with a polyimide precursor solution containing a polyimide precursor having a glass transition temperature Tg of 300° C. or higher after imidization, an aqueous solvent containing water, an organic amine compound, and resin particles having a volume average particle size of more than 100 nm.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Means for solving the object described above, includes the following aspect.

According to an aspect of the present disclosure, there is provided a polyimide precursor solution containing a polyimide precursor having a glass transition temperature Tg of equal to or higher than 300° C. after imidization, an aqueous solvent containing water, an organic amine compound, and resin particles having a volume average particle size of equal to or less than 100 nm.

BRIEF DESCRIPTION OF THE DRAWINGS

Exemplary embodiment(s) of the present invention will be described in detail based on the following figures, wherein.

DETAILED DESCRIPTION

Figure 1:
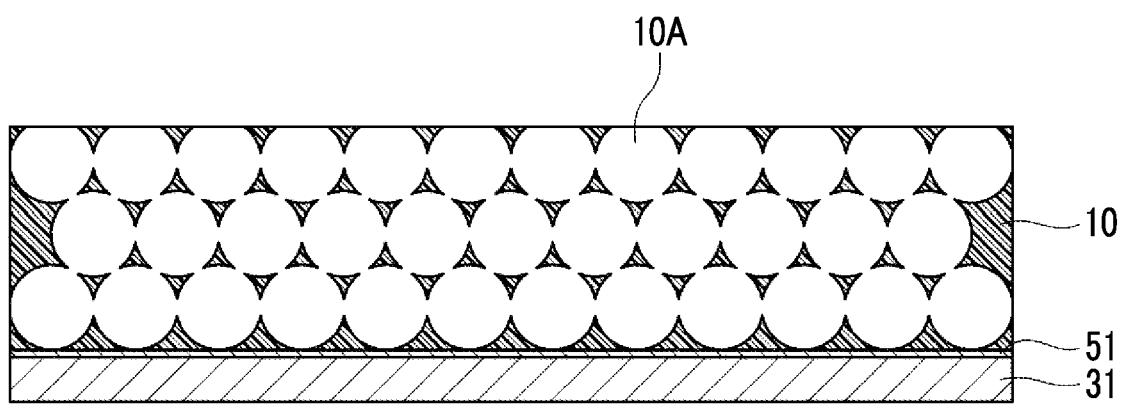
FIG. 1 is a schematic view showing a constitution of a porous polyimide film according to the present exemplary embodiment.

Hereinafter, exemplary embodiments that are examples of the present invention will be described in detail. Descriptions and examples herein exemplify exemplary embodiments and do not limit the scope of the invention.

In the numerical value range described stepwise in the present specification, an upper limit value or a lower limit value described in one numerical value range may be substituted with an upper limit value or a lower limit value of another numerical value range described stepwise. In addition, in the numerical value range described in the present specification, the upper limit value or the lower limit value of the numerical value range may be substituted with the value shown in the examples.

Each component may contain a plurality of substances. In a case of referring to an amount of each component in a composition, in a case where a plurality of substances corresponding to each component is present in the composition, unless otherwise specified, the amount means a sum of the plurality of substances present in the composition.

"Film" is a concept that includes not only what is generally called "film" but also what is generally called "membrane" and "sheet".

Polyimide Precursor Solution

A polyimide precursor solution according to the present exemplary embodiment contains a polyimide precursor having a glass transition temperature Tg of equal to or higher than 300° C. after imidization, an aqueous solvent containing water, an organic amine compound, and resin particles having a volume average particle size of equal to or less than 100 nm.

Here, a porous polyimide film is, for example, obtained by applying a polyimide precursor solution containing resin particles and drying, then heating the obtained film (that is, a dried film) to imidize the polyimide precursor and to form a polyimide film, and removing the resin particles.

The obtained porous polyimide film has sufficient breathability and high heat resistance. Since the porous polyimide film having a high glass transition temperature Tg has high heat resistance, it is difficult to become non-breathable or have reduced breathability even when the temperature becomes high (for example, a high temperature of equal to or higher than 350° C. and equal to or lower than 400° C.)

Therefore, the porous polyimide film alone is often not appropriate for applications that require thermoplastic properties and heat melting properties. For example, the porous polyimide film alone is often not appropriate for use as a separator for a secondary battery, which requires a shutdown function (a function of closing pores when the temperature becomes high).

In the related art, it is known that another thermoplastic or heat-meltable resin film is laminated on a porous polyimide film for the purpose of imparting shutdown characteristics to the porous polyimide film (for example, JP2017-057655A).

On the other hand, in the polyimide precursor solution according to the present exemplary embodiment, a polyimide precursor having a glass transition temperature Tg of equal to or higher than 300° C. after imidization is applied as the polyimide precursor, and resin particles having a volume average particle size of equal to or less than 100 nm are applied as the resin particles.

The porous polyimide film produced by using the polyimide precursor solution according to the present exemplary embodiment has sufficient breathability (for example, breathability of equal to or less than 700 (sec/100 mL)) and heat resistance (for example, heat resistance of equal to or higher than 250° C. and equal to or lower than 300° C.). In addition, since the porous polyimide film has a small-size communication pore having a pore size of equal to or less than 100 nm, the pores are crushed when the temperature becomes high (for example, a high temperature of equal to or higher than 350° C. and equal to or lower than 400° C.), and the pores become non-breathable or have reduced breathability. It is presumed that the reason is that a partition wall between the pores becomes thinner and finer due to the decrease in the pore size, and thus the thermal deformation temperature of the polyimide is lowered and the partition wall is easily deformed by heat.

From the above, it is presumed that the polyimide precursor solution according to the present exemplary embodiment can obtain a porous polyimide film having sufficient breathability and high heat resistance, and becoming non-breathable or having reduced breathability when the temperature becomes high.

Hereinafter, the details of the polyimide precursor solution according to the present exemplary embodiment will be described.

Polyimide Precursor

The polyimide precursor is obtained by polymerizing a tetracarboxylic dianhydride and a diamine compound. Specifically, the polyimide precursor is, for example, a resin (polyamic acid) having a repeating unit represented by General Formula (I).

[Chem. 1]

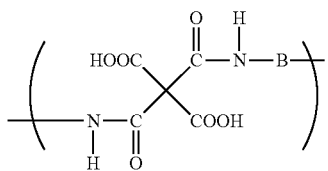

(In General Formula (I), A represents a tetravalent organic group and B represents a divalent organic group.)

Here, in General Formula (I), examples of the tetravalent organic group represented by A include a residue obtained by removing four carboxyl groups from the tetracarboxylic dianhydride used as a raw material.

On the other hand, examples of the divalent organic group represented by B include a residue obtained by removing two amino groups from the diamine compound used as a raw material.

That is, the polyimide precursor having a repeating unit represented by General Formula (I) is a polymer of a tetracarboxylic dianhydride and a diamine compound.

As the tetracarboxylic dianhydride, both aromatic and aliphatic compounds are exemplified, and the tetracarboxylic dianhydride may be, for example, the aromatic compound. That is, in General Formula (I), the tetravalent organic group represented by A may be, for example, an aromatic organic group.

Examples of the aromatic tetracarboxylic dianhydride include pyromellitic dianhydride, 3,3',4,4'-benzophenonetetracarboxylic dianhydride, 3,3',4,4'-biphenylsulfonetetracarboxylic dianhydride, 1,4,5,8-naphthalenetetracarboxylic dianhydride, 2,3,6,7-naphthalenetetracarboxylic dianhydride, 3,3',4,4'-biphenylethertetracarboxylic dianhydride, 3,3',4,4'-dimethyldiphenylsilane tetracarboxylic dianhydride, 3,3',4,4'-tetraphenylsilane tetracarboxylic dianhydride, 1,2,3,4-furantetracarboxlic dianhydride, 4,4'-bis(3,4-dicarboxyphenoxy)diphenylsulfide dianhydride, 4,4'-bis(3,4-dicarboxyphenoxy)diphenylsulfone dianhydride, 4,4'-bis(3,4-dicarboxyphenoxy)diphenylpropane dianhydride, 3,3',4,4'-perfluoroisopropylidenediphthalic dianhydride, 3,3',4,4'-biphenyltetracarboxylic dianhydride, 2,3,3',4'-biphenyltetracarboxylic dianhydride, bis(phthalic acid) phenylphosphine oxide dianhydride, p-phenylene-bis(triphenylphthalic acid) dianhydride, m-phenylene-bis(triphenylphthalic acid) dianhydride, bis(triphenylphthalic acid)-4,4'-diphenylether dianhydride, bis(triphenylphthalic acid)-4,4'-diphenylmethane dianhydride, and the like.

Examples of the aromatic tetracarboxylic dianhydride include 1,3,3a,4,5,9b-hexahydro-2,5-dioxo-3-furanyl)-naphtho[1,2-c]furan-1,3-dione, 1,3,3a,4,5,9b-hexahydro-5-methyl-5(tetrahydro-2,5-dioxo-3-furanyl)-naphtho[1,2-c]furan-1,3-dione, 1,3,3a,4,5,9b-hexahydro-8-methyl-5(tetrahydro-2,5-dioxo-3-furanyl)-naphtho[1,2-c]furan-1,3-dione, and the like.

Examples of the aliphatic tetracarboxylic dianhydride include aliphatic or alicyclic tetracarboxylic dianhydride such as butanetetracarboxylic dianhydride, 1,2,3,4-cyclobutanetetracarboxylic dianhydride, 1,3-dimethyl-1,2,3,4-cyclobutanetetracarboxylic dianhydride, 1,2,3,4-cyclopentanetetracarboxylic dianhydride, 2,3,5-tricarboxycyclopentylacetic dianhydride, 3,5,6-tricarboxynorbonane-2-acetate dianhydride, 2,3,4,5-tetrahydrofurantetracarboxylic dianhydride, 5-(2,5-dioxotetrahydrofuryl)-3-methyl-3-cyclohexene-1,2-dicarboxylic dianhydride, bicyclo[2,2,2]-oct-7-ene-2,3,5,6-tetracarboxylic dianhydride, and the like.

The tetracarboxylic dianhydride may be used alone or in combination of two or more kinds thereof.

On the other hand, the diamine compound is a diamine compound having two amino groups in the molecular structure. As the diamine compound, both aromatic and aliphatic compounds are exemplified, and the diamine compound may be, for example, the aromatic compound. That is, in General Formula (I), the divalent organic group represented by B may be, for example, an aromatic organic group.

Examples of the other diamine compound include aromatic diamines such as p-phenylenediamine, m-phenylenediamine, 4,4'-diaminodiphenylmethane, 4,4'-diaminodiphenylethane, 4,4'-diaminodiphenylether, 4,4'-diaminodiphenylsulfide, 4,4'-diaminodiphenylsulfone, 1,5-diaminonaphthalene, 3,3-dimethyl-4,4'-diaminobiphenyl, 5-amino-1-(4'-aminophenyl)-1,3,3-trimethylindane, 6-amino-1-(4'-aminophenyl)-1,3,3-trimethylindane, 4,4'-diaminobenzanilide, 3,5-diamino-3'-trifluoromethylbenzanilide, 3,5-diamino-4'-trifluoromethylbenzanilide, 3,4'-diaminodiphenylether, 2,7-diaminofluorene, 2,2-bis(4-aminophenyl)hexafluoropropane, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-diamino-2,2'-bis(trifluoromethyl)biphenyl, 2,2-bis[4-(4-aminophenoxy)phenyl] propane, 2,2-bis[4-(4-aminophenoxy)phenyl] hexafluoropropane, 1,4-bis(4-aminophenoxy)benzene, 4,4'-bis(4-aminophenoxy)-biphenyl, 1,3'-bis(4-aminophenoxy) benzene, 9,9-bis(4-aminophenyl)fluorene, 4,4'-(p-phenyleneisopropylidene)bisaniline, 4,4'-(m-phenyleneisopropylidene)bisaniline, 2,2'-bis[4-(4-amino-2-trifluoromethylphenoxy)phenyl]hexafluoropropane, and 4,4'-bis[4-(4-amino-2-trifluoromethyl)phenoxy]-octafluorobiphenyl; aromatic diamines having two amino groups bonded to an aromatic ring such as diaminotetraphenylthiophene and a hetero atom other than nitrogen atom of the amino group; aliphatic diamine and alicyclic diamine such as 1,1-metaxylylenediamine, 1,3-propanediamine, tetramethylenediamine, pentamethylenediamine, octamethylenediamine, nonamethylenediamine, 4,4-diaminoheptamethylenediamine, 1,4-diaminocyclohexane, isophoronediamine, tetrahydrodicyclopentadienylenediamine, hexahydro-4,7-methanoindanylene dimethylenediamine, tricyclo[6,2,1, $0^{2,7}$]-undecylene dimethyldiamine, and 4,4'-methylenebis (cyclohexylamine), and the like.

The diamine compound may be used alone or in combination of two or more kinds thereof.

A glass transition temperature Tg of the polyimide precursor after imidization is equal to or higher than 300° C., for example, preferably equal to or higher than 320° C., and more preferably equal to or higher than 330° C.

Polyimide having a glass transition temperature Tg in the above range is excellent in heat resistance. On the other hand, the thermoplasticity and heat meltability are low, and when the temperature becomes high, the pores of the porous polyimide film are difficult to be closed, and the shutdown characteristics are difficult to obtain.

However, in the polyimide precursor solution according to the present exemplary embodiment, resin particles having a volume average particle size of equal to or less than 100 nm are applied to obtain a porous polyimide film having a pore size of equal to or less than 100 nm. Therefore, while having heat resistance, the polyimide film becomes non-breathable or has reduced breathability when the temperature becomes high.

The polyimide precursor in which the glass transition temperature Tg after imidization is in the above range is, for example, a polymer of an aromatic tetracarboxylic dianhydride and an aromatic diamine compound.

In particular, from the viewpoint of obtaining a porous polyimide film having sufficient breathability and high heat resistance, and becoming non-breathable or having reduced breathability when the temperature becomes high, the polyimide precursor is, for example, preferably a polymer of an aromatic tetracarboxylic dianhydride containing equal to or more than 80 mol % (for example, preferably equal to or more than 90 mol %, and more preferably 100 mol %) of biphenyltetracarboxylic dianhydride with respect to the total tetracarboxylic dianhydride, and an aromatic diamine compound containing equal to or more than 80 mol % (for example, preferably equal to or more than 90 mol %, and more preferably 100 mol %) of p-phenylenediamine with respect to the total diamine compound.

The glass transition temperature Tg of the polyimide precursor after imidization, that is, the glass transition temperature Tg of the polyimide is measured as a peak temperature of tan δ (loss tangent) measured by a dynamic viscoelasticity measuring device.

Specifically, in a case of the porous polyimide film obtained by the polyimide precursor solution according to the present exemplary embodiment, the structure changes at a temperature equal to or lower than the glass transition temperature, and thus heating is performed to 400° C. for 1 hour in advance, and then measurement is performed by a sinusoidal vibration method under the following conditions by the dynamic viscoelasticity measuring device (ARES measuring system, TA Instruments).

Temperature rise rate: 1° C./min
Measurement frequency: 1 rad/sec
Measurement interval: 0.5° C.

A number average molecular weight of the polyimide precursor may be, for example, equal to or more than 1,000 and equal to or less than 150,000, more preferably equal to or more than 5,000 and equal to or less than 130,000, and still more preferably equal to or more than 10,000 and equal to or less than 100,000.

In a case where the number average molecular weight of the polyimide precursor is within the above range, the decrease in the solubility of the polyimide precursor in a solvent is suppressed, and the film-forming property is easily ensured.

The number average molecular weight of the polyimide precursor is measured by a gel permeation chromatography (GPC) method under the following measurement conditions.

Column: Tosoh TSK gel α-M (7.8 mm I.D×30 cm)
Eluent: dimethylformamide (DMF)/30 mM LiBr/60 mM phosphoric acid
Flow rate: 0.6 mL/min
Injection amount: 60 μL
Detector: differential refractive index detector (RI)

A content (concentration) of the polyimide precursor may be, for example, equal to or more than 0.1% by mass and equal to or less than 40% by mass preferably equal to or more than 0.5% by mass and equal to or less than 25% by mass, and more preferably equal to or more than 1% by mass and equal to or less than 20% by mass, with respect to the polyimide precursor solution.

Resin Particles

As the resin particles, particles that do not dissolve in the polyimide precursor solution are used.

Here, "not dissolve" also includes the matter that a target substance dissolves in a range of equal to or less than 3% by mass with respect to a target liquid at 25° C.

The resin particles may be used alone or in combination of two or more.

The resin particles are not particularly limited, but are resin particles made of a resin other than polyimide.

Examples thereof include resin particles obtained by polycondensing polymerizable monomers such as polyester resin and urethane resin, and resin particles obtained by radical polymerization of polymerizable monomers such as vinyl resin, olefin resin, and fluororesin. Examples of the resin particles obtained by radical polymerization include resin particles such as (meth)acrylic resin, (meth)acrylic acid ester resin, styrene/(meth)acrylic resin, polystyrene resin, and polyethylene resin.

Among these, the resin particles are, for example, at least one selected from the group consisting of (meth)acrylic resin, (meth)acrylic acid ester resin, styrene/(meth)acrylic resin, and polystyrene resin.

In addition, in the present exemplary embodiment, "(meth)acrylic" means that both "acrylic" and "methacryl" are included.

In addition, the resin particles may or may not be crosslinked. In the imidization step of the polyimide precursor, the resin particles are, for example, preferably uncrosslinked resin particles, from the viewpoint of effectively contributing to the relaxation of residual stress. Further, the polyimide precursor solution contains, for example, more preferably vinyl resin particles obtained by emulsion polymerization as resin particles from the viewpoint of simplifying a step of producing the polyimide precursor solution.

In a case where the resin particles are vinyl resin particles, the resin particles are obtained by polymerizing a monomer. Examples of the vinyl resin monomer include the monomers shown below. Examples thereof include vinyl resin unit obtained by polymerizing a monomer such as styrenes having a styrene skeleton such as styrene, an alkyl-substituted styrene (for example, α-methylstyrene, 2-methylstyrene, 3-methylstyrene, 4-methylstyrene, 2-ethylstyrene, 3-ethylstyrene, 4-ethylstyrene, and the like), a halogen-substituted styrene (for example, 2-chlorostyrene, 3-chlorostyrene, 4-chlorostyrene, and the like), and vinylnaphthalene; esters having a vinyl group such as methyl(meth)acrylate, ethyl(meth)acrylate, n-propyl(meth)acrylate, n-butyl(meth)acrylate, lauryl(meth)acrylate, 2-ethylhexyl (meth)acrylate, and trimethylolpropane trimethacrylate (TMPTMA); vinyl nitriles such as acrylonitrile and methacrylonitrile; vinyl ethers such as vinyl methyl ether and vinyl isobutyl ether; vinyl ketones such as vinyl methyl ketone, vinyl ethyl ketone, vinyl isopropenyl ketone; acids such as (meth)acrylic acid, maleic acid, cinnamic acid, fumaric acid, and vinylsulfonic acid; and bases such as ethyleneimine vinylpyridine, and vinylamine.

As other monomers thereof, monofunctional monomers such as vinyl acetate, difunctional monomers such as ethylene glycol dimethacrylate, nonane diacrylate, and decanediol diacrylate, and polyfunctional monomers such as trimethylolpropane triacrylate and trimethylolpropane trimethacrylate may be used in combination.

In addition, the vinyl resin may be a resin which is obtained by using one monomer among these monomers alone, or may be a resin which is copolymer obtained by using two or more monomers.

The resin particles have, for example, an acidic group on a surface from the viewpoint that the dispersibility is improved and the generation of pinholes is suppressed. The acidic group present on the surface of the resin particles is considered to function as a dispersant for the resin particles by reacting with a base such as an organic amine compound used for dissolving the polyimide precursor in an aqueous solvent to form a salt. Therefore, it is considered that the dispersibility of the resin particles in the polyimide precursor solution is improved.

In particular, in a case where the surface of the resin particles has an acidic group (in particular, a carboxy group), the dispersibility is improved and the generation of pinholes is suppressed, and thus it becomes easy to obtain a porous polyimide film that becomes non-breathable or has reduced breathability when the temperature becomes high, while having sufficient breathability and high heat resistance.

The acidic group on the surface of the resin particles is not particularly limited, but may be at least one selected from the group consisting of a carboxy group, a sulfonic acid group, and a phenolic hydroxyl group. Among these, the acidic group is, for example, a carboxy group.

The monomer for having an acidic group on the surface of the resin particles is not particularly limited as long as it is a monomer having an acidic group. Examples thereof include a monomer having a carboxy group, a monomer having a sulfonic acid group, a monomer having a phenolic hydroxyl group, and salts thereof.

Specific examples include a monomer having a sulfonic acid group such as p-styrene sulfonic acid and 4-vinylbenzene sulfonic acid; a monomer having a phenolic hydroxyl group such as 4-vinyldihydrosilicate, 4-vinylphenol, and 4-hydroxy-3-methoxy-1-propenylbenzene; a monomer having a carboxy group such as acrylic acid, crotonic acid, methacrylic acid, 3-methylcrotonic acid, fumaric acid, maleic acid, 2-methylisocrotonic acid, 2,4-hexadienedioic acid, 2-pentenoic acid, sorbic acid, citraconic acid, 2-hexenoic acid, monoethyl fumarate; and salts thereof. These monomers having an acidic group may be polymerized by being mixed with a monomer not having an acidic group, or monomers not having an acidic group may be polymerized and granulated, and then may be polymerized with the monomers having an acidic group on the surface. In addition, these monomers may be used alone or in combination of two or more.

Among these, the monomers are, for example, preferably monomers having a carboxy group such as acrylic acid, crotonic acid, methacrylic acid, 3-methylcrotonic acid, fumaric acid, maleic acid, 2-methylisocrotonic acid, 2,4-hexadienediodic acid, 2-pentenoic acid, sorbic acid, citraconic acid, 2-hexenoic acid, monoethyl fumarate and the like, and salts thereof. The monomer having a carboxy group may be used alone or in combination of two or more.

That is, the resin particles having an acidic group on the surface have, for example, preferably a skeleton derived from a monomer having at least one carboxy group selected from the group consisting of acrylic acid, crotonic acid, methacrylic acid, 3-methylcrotonic acid, fumaric acid, maleic acid, 2-methylisocrotonic acid, 2,4-hexadienedioic acid, 2-pentenic acid, sorbic acid, citraconic acid, 2-hexenoic acid, monoethyl fumarate, and the like, and salts thereof.

In a case where a monomer having an acidic group and a monomer not having an acidic group are mixed and polymerized, an amount of the monomer having an acidic group is not particularly limited, but in a case where the amount of the monomer having an acidic group is too small, there is a case where the dispersibility of the resin particles in the polyimide precursor solution decrease, and in a case where the amount of the monomer having an acidic group is too large, there is a case where an aggregate of the polymer occurs at a time of emulsion polymerization. Therefore, the monomer having an acidic group is, for example, preferably equal to or more than 0.3% by mass and equal to or less than 20% by mass, more preferably equal to or more than 0.5% by mass and equal to or less than 15% by mass, and particularly preferably equal to or more than 0.7% by mass and equal to or less than 10% by mass, of the entire monomer.

On the other hand, in a case where a monomer not having an acidic group is emulsion-polymerized and then a monomer having an acidic group is further added and polymerized, from the same viewpoint, the amount of the monomer having an acidic group is, for example, preferably equal to or more than 0.01% by mass and equal to or less than 10% by mass, more preferably equal to or more than 0.05% by mass and equal to or less than 7% by mass, and particularly preferably equal to or more than 0.07% by mass and equal to or less than 5% by mass, of the entire monomer.

As described above, the resin particles are, for example, preferably not crosslinked, but in a case where a crosslinking agent is used as at least a part of the monomer component when the resin particles are crosslinked, a proportion of the crosslinking agent in all the monomer components is, for example, preferably equal to or more than 0% by mass and equal to or less than 20% by mass, more preferably equal to or more than 0% by mass and equal to or less than 5% by mass, and particularly preferably 0% by mass.

In a case where the monomer used in the resin constituting the vinyl resin particles contains styrene, a proportion of styrene in all the monomer components is, for example, preferably equal to or more than 20% by mass and equal to or less than 100% by mass, and still more preferably equal to or more than 40% by mass and equal to or less than 100% by mass.

The resin particles may be obtained by polymerizing a monomer having an acidic group on the surface of a commercially available product. Specifically, examples of the crosslinked resin particles include crosslinked polymethyl methacrylate (MBX-series, manufactured by Sekisui Kasei Co., Ltd.), crosslinked polystyrene (SBX-series, manufactured by Sekisui Kasei Co., Ltd.), copolymer crosslinked resin particles of methyl methacrylate and styrene (MSX-series, manufactured by Sekisui Kasei Co., Ltd.).

In addition, examples of the non-crosslinked resin particles include polymethyl methacrylate (MB-series, manufactured by Sekisui Kasei Co., Ltd.) and (meth)acrylate ester/styrene copolymer (FS-series: manufactured by Nippon Paint Co., Ltd.).

A weight average molecular weight of the resin particles is, for example, preferably equal to or more than 200,000, more preferably equal to or more than 300,000, and still more preferably equal to or more than 350,000.

In a case where the weight average molecular weight of the resin particles is within the above range, it becomes easy to obtain a porous polyimide film having pores having a pore size equivalent to the particle size of the resin particles. As a result, a removability of the resin particles becomes good, and it is easy to obtain a porous polyimide film that has sufficient breathability and high heat resistance and becomes non-breathable or has reduced breathability when the temperature becomes high.

However, in a case where a weight average molecular weight of the resin particles is too high, a part of the resin particles remains when the resin particles are removed, and it becomes difficult to obtain a porous polyimide film having a pore size of a targeted size. Therefore, an upper limit of the weight average molecular weight of the resin particles may be, for example, equal to or less than 5 million.

The weight average molecular weight of the resin particles is measured by gel permeation chromatography (GPC) The molecular weight measurement by GPC is performed with a THF solvent, using GPC/HLC-8120GPC manufactured by Tosoh Corporation as a measuring device, and using Column/TSKgel SuperHM-M (15 cm) manufactured by Tosoh Corporation. The weight average molecular weight and the number average molecular weight are calculated from this measurement result using a molecular weight calibration curve prepared from a monodisperse polystyrene standard sample.

A volume average particle size of the resin particles is equal to or less than 100 nm, for example, preferably equal to or less than 95 nm, and still more preferably equal to or less than 90 nm. However, an lower limit of the volume average particle size of the resin particles is, for example, equal to or more than 40 nm from the viewpoint of ensuring the breathability of the obtained porous polyimide film and manufacturing thereof.

In a case where the volume average particle size of the resin particles is set to the above range, a porous polyimide film in which a partition wall between the pores is plastically deformed or melted when the temperature becomes high, and that becomes non-breathable or has reduced breathability when the temperature becomes high may be obtained while ensuring the breathability of the obtained porous polyimide film.

A volume particle size distribution index (GSDv) of the resin particles is, for example, preferably equal to or less than 1.30, more preferably equal to or less than 1.25, and most preferably equal to or less than 1.20.

The volume average particle size of the resin particles is determined by subtracting cumulative distribution from a small particle size side of volume relative to the divided particle size range (channel), using particle size distribution obtained by measurement with a laser diffraction type particle size distribution measuring device (for example, the above-mentioned Coulter Counter LS13 manufactured by Beckman Coulter), and measuring the particle size that is 50% cumulative with respect to all particles as a volume average particle size D50v.

In addition, the volume particle size distribution index of the resin particles is calculated as $(D84v/D16v)^{1/2}$ from the particle size distribution of the particles in the polyimide precursor solution. In the volume cumulative distribution drawn from the small size side of the volume of the resin particles, the particle size that is 16% cumulative is defined as the volume particle size D16v, the particle size that is 50% cumulative is defined as the volume average particle size D50v.

From the viewpoint of obtaining a porous polyimide film having sufficient breathability and high heat resistance, and becoming non-breathable or having reduced breathability when the temperature becomes high, a content of the resin particles on a volume basis is, for example, preferably equal to or more than 40% by volume and equal to or less than 80% by volume, and more preferably equal to or more than 50% by volume and equal to or less than 78% by volume, with respect to a solid content of the polyimide precursor solution.

Aqueous Solvent

An aqueous solvent is an aqueous solvent containing water.

Examples of water include distilled water, ion-exchanged water, ultrafiltered water, pure water, and the like.

A content of water is, for example, preferably equal to or more than 50% by mass with respect to the total amount of the aqueous solvent.

By setting the content of water within the above numerical value range, a boiling point of the aqueous solvent is further lowered. Therefore, the aqueous solvent is more likely to boil in gaps between the polyimide precursors. As a result, a larger number of pores formed by volatilization of the aqueous solvent are formed, and it becomes easier to form a structure in which the pores communicate with each other.

A content of the water is, for example, more preferably equal to or more than 70% by mass and equal to or less than 100% by mass, and still more preferably equal to or more than 80% by mass and equal to or less than 100% by mass with respect to the entire aqueous solvent.

The aqueous solvent may contain a solvent other than water.

The solvent other than water is, for example, preferably water-soluble. Here, water-soluble means that at 25° C., the target substance dissolves in water by equal to or more than 1% by mass.

Examples of the solvent other than water include a water-soluble organic solvent and an aprotic polar solvent. The solvent other than water is, for example, preferably an aprotic polar solvent.

Examples of the water-soluble organic solvent include a water-soluble ether-based solvent, a water-soluble ketone-based solvent, a water-soluble alcohol-based solvent, and the like.

The water-soluble ether-based solvent is a water-soluble solvent having an ether bond in one molecule.

Examples of the water-soluble ether-based solvent include tetrahydrofuran (THF), dioxane, trioxane, 1,2-dimethoxyethane, diethylene glycol dimethyl ether, diethylene glycol diethyl ether, and the like. Among these, the water-soluble ether-based solvent is, for example, preferably tetrahydrofuran and dioxane.

The water-soluble ketone-based solvent is a water-soluble solvent having a ketone group in one molecule.

Examples of the water-soluble ketone-based solvent include acetone, methyl ethyl ketone, cyclohexanone, and the like. Among these, the water-soluble ketone-based solvent is, for example, preferably acetone.

The water-soluble alcohol-based solvent is a water-soluble solvent having an alcoholic hydroxyl group in one molecule. Examples of the water-soluble alcohol-based solvent include methanol, ethanol, 1-propanol, 2-propanol, tert-butyl alcohol, ethylene glycol, ethylene glycol monoalkyl ether, propylene glycol, propylene glycol monoalkyl ether, diethylene glycol, diethylene glycol monoalkyl ether, 1,2-propanediol, 1,3-propanediol, 1,3-butanediol, 1,4-butanediol, 2,3-butanediol, 1,5-pentanediol, 2-butene-1,4-diol, 2-methyl-2,4-pentanediol, glycerin, 2-ethyl-2-hydroxymethyl-1,3-propanediol, 1,2,6-hexanetriol, and the like. Among these, the water-soluble alcohol-based solvent is, for example, preferably methanol, ethanol, 2-propanol, ethylene glycol, ethylene glycol monoalkyl ether, propylene glycol, propylene glycol monoalkyl ether, diethylene glycol, diethylene glycol monoalkyl ether, and the like.

Examples of the aprotic polar solvent include a solvent having a boiling point of equal to or higher than 150° C. and equal to or lower than 300° C. and a dipole moment of equal to or more than 3.0 D and equal to or less than 5.0 D.

Specific examples of the aprotic polar solvent include N-methyl-2-pyrrolidone (NMP), N,N-dimethylformamide (DMF), N,N-dimethylacetamide (DMAc), dimethyl sulfoxide (DMSO), hexamethylene phosphoramide (HMPA), N-methylcaprolactam, N-acetyl-2-pyrrolidone, 1,3-dimethyl-2-imidazolidinone (DMI), N,N'-dimethylpropyleneurea, tetramethylurea, trimethyl phosphate, triethyl phosphate, and the like.

The aqueous solvent may contain an aprotic polar solvent as a solvent other than water.

In a case where the aqueous solvent contains an aprotic polar solvent as a solvent other than water, a content of the aprotic polar solvent is, for example, preferably equal to or more than 1 part by mass and equal to or less than 50 parts by mass, more preferably equal to or more than 3 parts by mass and equal to or less than 45 parts by mass, and still more preferably equal to or more than 5 parts by mass and equal to or less than 45 parts by mass with respect to 100 parts by mass of the resin particles.

Organic Amine Compound

The organic amine compound is a compound which makes the polyimide precursor (carboxy group thereof) into an amine salt, enhances the solubility thereof in the aqueous solvent thereof, and also functions as an imidization accelerator. Specifically, the organic amine compound may be, for example, an amine compound having a molecular weight of equal to or less than 170. The organic amine compound is a compound other than diamine, which is a raw material of the polyimide precursor.

An action of enhancing solubility in the aqueous solvent thereof and an action of promoting imidization by making the polyimide precursor (carboxy group thereof) of organic amine amine-chlorinated are enhanced in a case where the content of water contained in the aqueous solvent is equal to or more than 50% by mass relative to the entire aqueous solvent.

Therefore, the polyimide precursor solution contains an organic amine compound, and the content of water is, for example, equal to or more than 50% by mass with respect to the entire aqueous solvent.

The organic amine compound may be, for example, a water-soluble compound.

Examples of the organic amine compound include a primary amine compound, a secondary amine compound, and a tertiary amine compound.

Among these, the organic amine compound may be, for example, at least one selected from the group consisting of a secondary amine compound and a tertiary amine compound (particularly, tertiary amine compound). In a case where a tertiary amine compound or a secondary amine compound is applied as the organic amine compound (particularly, the tertiary amine compound), the solubility of the polyimide precursor in the solvent is easily increased, the film-forming property is easily improved, and the storage stability of the polyimide precursor solution is easily improved.

In addition, examples of the organic amine compound include a divalent or higher polyvalent amine compound in addition to a monovalent amine compound. In a case where a divalent or higher polyvalent amine compound is applied, a pseudo-crosslinked structure is easily formed between the molecules of the polyimide precursor, and the storage stability of the polyimide precursor solution is easily improved.

Examples of the primary amine compound include methylamine, ethylamine, n-propylamine, isopropylamine, 2-ethanolamine, 2-amino-2-methyl-1-propanol, and the like.

Examples of the secondary amine compound include dimethylamine, 2-(methylamino)ethanol, 2-(ethylamino)ethanol, morpholine, and the like.

Examples of the tertiary amine compound include 2-dimethylaminoethanol, 2-diethylaminoethanol, 2-dimethylaminopropanol, pyridine, triethylamine, picoline, N-methylmorpholine, N-ethylmorpholine, 1,2-dimethylimidazole, 2-ethyl-4-methylimidazole, and the like.

From the viewpoint of pot life of the polyimide precursor solution and film thickness uniformity, the organic amine compound is, for example, a tertiary amine compound. In this regard, the organic amine compound is, for example, at least one selected from the group consisting of 2-dimethylaminoethanol, 2-diethylaminoethanol, 2-dimethylaminopropanol, pyridine, triethylamine, picoline, N-methylmorpholine, N-ethylmorpholine, 1,2-dimethylimidazole, 2-ethyl-4-methylimidazole, N-methylpiperidine, and N-ethylpiperidine.

Here, the organic amine compound is, for example, preferably an amine compound having a heterocyclic structure containing nitrogen (particularly, a tertiary amine compound) from the viewpoint of film-forming property.

Examples of the amine compound having a heterocyclic structure containing nitrogen (hereinafter, referred to as "nitrogen-containing heterocyclic amine compound") include isoquinolins (amine compound having an isoquinolin skeleton), pyridines (amine compound having a pyridine skeleton), pyrimidines (amine compound having a pyrimidine skeleton), pyrazines (amine compound having a pyrazine skeleton), piperazines (amine compound having a piperazine skeleton), triazines (amine compound having a triazine skeleton), imidazoles (amine compound having an imidazole skeleton), morpholines (amine compound having a morpholine skeleton), polyaniline, polypyridine, polyamine, and the like.

The organic amine compound is, for example, preferably at least one selected from the group consisting of morpholines, pyridines, piperidines, and imidazoles, and, for example, more preferably at least one selected from the group consisting of morpholines and imidazoles, from the viewpoint of film-forming property.

The organic amine compound may be, for example, a compound having a boiling point of equal to or higher than 60° C. (for example, preferably equal to or higher than 60° C. and equal to or lower than 200° C., and more preferably equal to or higher than 70° C. and equal to or lower than 150° C.).

In a case where the boiling point of the organic amine compound is equal to or higher than 60° C., the organic amine compound is suppressed from volatilizing from the polyimide precursor solution during storage, and the decrease in solubility of the polyimide precursor in the solvent is easily suppressed.

The organic amine compound may be, for example, contained in an amount of equal to or more than 50 mol % and equal to or less than 500 mol %, for example, preferably equal to or more than 80 mol % and equal to or less than 250 mol %, and more preferably equal to or more than 90 mol % and equal to or less than 200 mol %, with respect to the carboxy group (—COOH) of the polyimide precursor in the polyimide precursor solution.

In a case where a content of the organic amine compound is within the above range, the solubility of the polyimide precursor in the solvent is more easily increased, and the film-forming property is easily improved. In addition, the storage stability of the polyimide precursor solution is easily improved.

The organic amine compound may be used alone or in combination of two or more kinds thereof.

Other Additives

The polyimide precursor solution according to the present exemplary embodiment may contain a catalyst for promoting the imidization reaction, a leveling agent for improving film forming quality, and the like.

As the catalyst for promoting the imidization reaction, a dehydrating agent such as an acid anhydride, an acid catalyst such as a phenol derivative, a sulfonic acid derivative, a benzoic acid derivative, and the like may be used.

In addition, in the polyimide precursor solution, as a material other than inorganic particles having a volume average particle size of equal to or more than 0.001 μm and equal to or less than 0.2 μm, depending on the purpose of use, for example, a conductive material added for imparting conductivity (conductivity (for example, the volume resistivity is less than 107 Ω·cm) or semi-conductivity (for example, the volume resistivity is equal to or more than 107 Ω·cm and equal to or less than $10^{13}$ Ω·cm)) may be contained.

Examples of the conductive material include carbon black (for example, acidic carbon black having a pH of equal to or less than 5.0); metal (for example, aluminum or nickel, and the like); metal oxide (for example, yttrium oxide, tin oxide, and the like); ion conductive material (for example, potassium titanate, LiCl, and the like); and the like. These conductive materials may be used alone or in combination of two or more kinds thereof.

Method for Producing Porous Polyimide Film

Hereinafter, an example of a method for producing a porous polyimide film according to the present exemplary embodiment will be described.

The porous polyimide film according to the present exemplary embodiment has, for example, the following steps.

A first step of applying the polyimide precursor solution to form a coating film, and then drying the coating film to form a film containing the polyimide precursor and organic particles.

A second step of heating the film, imidizing the polyimide precursor to form a polyimide film, and performing a process of removing the organic particles.

In the description of the production method, FIG. 1 referred to is a schematic view showing a constitution of the porous polyimide film according to the present exemplary embodiment.

In FIG. 1, the same components are designated by the same reference numerals. In the reference numerals in FIG. 1, 31 represents a substrate, 51 represents a release layer, 10A represents a pore, and 10 represents a porous polyimide film.

First Step

In the first step, a polyimide precursor solution is first prepared.

Examples of the method for preparing a polyimide precursor solution according to the present exemplary embodiment include a method according to (i) and (ii) below.

(i) A method of preparing a polyimide precursor solution before dispersing resin particles, and then mixing and dispersing resin particles (powder or organic solvent dispersion).

(ii) A method for synthesizing a polyimide precursor in an organic solvent dispersion of resin particles.

(i) A method of preparing a polyimide precursor solution before dispersing resin particles, and then mixing and dispersing the resin particles.

First, examples of the method of preparing a polyimide precursor solution before dispersing resin particles include a method of obtaining a polyimide precursor solution before dispersing resin particles by polymerizing a tetracarboxylic dianhydride and a diamine compound in an organic solvent using a known method to produce a resin (polyimide precursor).

Next, the polyimide precursor solution before dispersing the obtained resin particles is mixed with resin particles, described in the section of resin particles, and the mixture is stirred. Alternatively, the resin particles are redispersed in an organic solvent that does not dissolve the resin particles (either alone or in a mixed solvent), and then may be mixed and stirred with the polyimide precursor solution.

The mixing, stirring, and dispersing methods are not particularly limited. In addition, in order to improve the dispersibility of the resin particles, a known nonionic or ionic surfactant may be added.

(ii) A method for synthesizing a polyimide precursor in an organic solvent dispersion of resin particles.

First, a solution, in which resin particles are dispersed in an organic solvent in which the resin particles are not dissolved and the polyimide precursor is dissolved, is prepared. Next, an organic solvent solution of the polyimide precursor is obtained by polymerizing the tetracarboxylic dianhydride and the diamine compound in the solution to produce a resin (polyimide precursor).

The polyimide precursor solution obtained by the above method is applied onto a substrate to form a coating film containing the polyimide precursor and organic particles. Then, the coating film formed on the substrate is dried to form a film containing the polyimide precursor and the organic particles.

The substrate on which the polyimide precursor solution is applied is not particularly limited. Examples of the substrate include resin substrates such as polystyrene and polyethylene terephthalate; glass substrates; ceramic substrates; metal substrates such as iron and stainless steel (SUS); and composite material substrates in which these materials are combined. Further, as necessary, the substrate may be, for example, provided with a release layer by performing a release treatment with a silicone-based or fluorine-based release agent.

The method of applying the polyimide precursor solution on the substrate is not particularly limited. For example, various methods such as a spray coating method, a rotary coating method, a roll coating method, a bar coating method, a slit die coating method, and an inkjet coating method can be exemplified.

The applying amount of the polyimide precursor solution to obtain a coating film containing the polyimide precursor and the organic particles may be set to an amount capable of obtaining a predetermined film thickness.

After forming the coating film containing the polyimide precursor and the organic particles, the coating film dried to form a film containing the polyimide precursor and the organic particles. Specifically, the coating film containing a polyimide precursor and organic particles is dried by a method such as heat drying, natural drying, and vacuum drying to form a film. More specifically, the film is formed by drying the coating film so that the solvent remaining in the film is equal to or less than 50%, for example, preferably equal to or less than 30% with respect to the solid content of the film.

Second Step

The second step is a step of heating the film containing the polyimide precursor and the organic particles obtained in the first step, and imidizing the polyimide precursor to form a polyimide film. The second step includes a process of removing organic particles. A porous polyimide film is obtained through the process of removing organic particles.

In the second step, in the step of forming the polyimide film, specifically, the film containing the polyimide precursor and the organic particles obtained in the first step is heated to proceed imidization, and further heated to form a polyimide film with advanced imidization. As imidization proceeds, and the imidization rate increases, it becomes more difficult to dissolve in an organic solvent.

Then, in the second step, a process of removing organic particles is performed. The organic particles may be removed in the process of heating the film to imidize the polyimide precursor, or may be removed from the polyimide film after the imidization is completed (after imidization).

In the present exemplary embodiment, the process of imidizing the polyimide precursor refers to a process of heating the film containing the polyimide precursor and the organic particles obtained in the first step, advancing imidization, and making the polyimide precursor to be in a state before the polyimide film is formed after imidization is completed.

The process of removing the organic particles is, for example, preferably performed in a case where the imidization rate of the polyimide precursor in the polyimide film is equal to or more than 10% in the process of imidizing the polyimide precursor from the viewpoint of removability of the organic particles and the like. In a case where the imidization rate is equal to or more than 10%, the shape of the film is easily maintained.

Next, the process of removing the organic particles will be described.

First, a process of removing resin particles will be described.

Examples of the process of removing the resin particles include a method of removing the resin particles by heating, a method of removing the resin particles with an organic solvent that dissolves the resin particles, and a method of removing the resin particles by decomposition with a laser or the like. Among these, for example, a method of removing the resin particles by heating and a method of removing the resin particles with an organic solvent that dissolves the resin particles are, for example, preferably used.

As the method of removing by heating, for example, in the process of imidizing the polyimide precursor, the resin particles may be removed by decomposing the resin particles by heating for advancing the imidization. In this case, from the viewpoint that there is no operation of removing the resin particles with a solvent, the method is useful for reducing the number of steps.

Examples of the method of removing the resin particles with an organic solvent that dissolves the resin particles include a method of removing the resin particles by allowing the resin particles to contact with the organic solvent (for example, immersing in a solvent) that dissolves the resin particles, and dissolving the resin particles. In a case where the resin particles are immersed in the solvent in this state, the dissolution efficiency of the resin particles is increased, for example.

The organic solvent that dissolves the resin particles for removing the resin particles is not particularly limited as long as the organic solvent does not dissolve the polyimide film before imidization is completed and the polyimide film after imidization is completed, and the resin particles are soluble therein. Examples of the organic solvent include ethers such as tetrahydrofuran (THF); aromatics such as toluene; ketones such as acetone; and esters such as ethyl acetate.

In a case where the resin particles are removed by dissolution removal to make a polyimide film porous, resin particles that are soluble in a general-purpose solvent such as tetrahydrofuran, acetone, toluene, and ethyl acetate are, for example, preferably used. Water can also be used depending on the resin particles and the polyimide precursor used.

In addition, in a case where the resin particles are removed by heating to make a polyimide film porous, the resin particles are not decomposed at a drying temperature after applying, but are thermally decomposed at a temperature for imidizing the film of the polyimide precursor. From this viewpoint, the thermal decomposition start temperature of the resin particles may be, for example, equal to or higher than 150° C. and equal to or lower than 320° C., for example, preferably equal to or higher than 180° C. and equal to or lower than 300° C., and more preferably equal to or higher than 200° C. and equal to or lower than 280° C.

In the second step, the heating method for heating the film obtained in the first step to proceed imidization to obtain a polyimide film is not particularly limited. For example, a method of heating in two stages can be exemplified. In the case of heating in two stages, the following heating conditions can be specifically exemplified.

As the heating condition of the first stage, for example, it is sought that the temperature is set such that the shape of the organic particles is maintained.

Specifically, for example, the temperature may be preferably in a range of equal to or higher than 50° C. and equal to or lower than 150° C., and, for example, in a range of equal to or higher than 60° C. and equal to or lower than 140° C. In addition, the heating time may be, for example, in a range of equal to or more than 10 minutes and equal to or less than 60 minutes. The higher the heating temperature, the shorter the heating time may be.

Examples of the heating conditions of the second stage include heating under the condition of equal to or higher than 150° C. and equal to or lower than 450° C. (for example, preferably equal to or higher than 200° C. and equal to or lower than 430° C.) for equal to or more than 20 minutes and equal to or less than 120 minutes. By setting the heating conditions in this range, the imidization reaction further proceeds and a polyimide film can be formed. During the heating reaction, the temperature may be, for example, increased in stages or gradually at a constant rate before the final temperature of heating is reached.

The heating conditions are not limited to the above two-stage heating method, and for example, a one-stage heating method may be adopted. In a case of the one-stage heating method, for example, the imidization may be completed only by the heating conditions shown in the above second stage.

In the second step, from the viewpoint of increasing the aperture ratio, for example, a process of exposing the organic particles is preferably performed to make the organic particles into a state of being exposed. In the second step, the process of exposing the organic particles is, for example, preferably performed during a process of imidizing the polyimide precursor, or after the imidization, and before the process of removing the organic particles.

In this case, for example, in a case where a film is formed on a substrate using a polyimide precursor solution, the polyimide precursor solution is applied onto the substrate to form a coating film in which organic particles are embedded. Next, the coating film is dried to form a film containing a polyimide precursor and organic particles. The film formed by this method is in a state in which organic particles are embedded. The film may be subjected to a process of imidizing the polyimide precursor or a process of exposing the organic particles from the polyimide film after the imidization is completed (after imidization) before heating and removing the organic particles.

In the second step, the process of exposing the organic particles may be performed, for example, when the polyimide film is in the following state.

In a case where a process of exposing organic particles is performed when the imidization rate of the polyimide precursor in the polyimide film is less than 10% (that is, in a state in which the polyimide film can be dissolved in the solvent), the process of exposing the organic particles embedded in the polyimide film include a wiping process, a process of immersing the organic particles in a solvent, and the like. The solvent used at this time may be the same as or different from the solvent used for the polyimide precursor solution according to the present exemplary embodiment.

In addition, in a case where the process of exposing the organic particles is performed when the imidization rate of the polyimide precursor in the polyimide film is equal to or more than 10% (that is, in a state in which it is difficult to dissolve in water or an organic solvent), and when the polyimide film is in a state of having undergone imidization, a method of exposing the organic particles by mechanically cutting the organic particles with a tool such as a paper file, a method of exposing the resin particles by decomposing the resin particles with a laser, and the like are exemplified.

For example, in the case of mechanical cutting, a portion of the organic particles present in the upper region (that is, the region on a side of the organic particles being away from the substrate) of the organic particles embedded in the polyimide film are cut together with the polyimide film present in the upper region of the organic particles, and the cut organic particles are exposed from the surface of the polyimide film.

Thereafter, the organic particles are removed from the polyimide film in which the organic particles are exposed by the above-mentioned organic particle removing process. Then, a porous polyimide film from which organic particles have been removed is obtained (refer to FIG. 1).

In the above description, the production step of the porous polyimide film subjected to the process of exposing the organic particles in the second step has been described, but in terms of increasing the aperture ratio, the process of exposing the organic particles may also be performed in the first step. In this case, in the first step, after obtaining the coating film, the organic particles may be in an exposed state by performing the process of exposing the organic particles in the process of drying to form the film. By performing the process of exposing the organic particles, the aperture ratio of the porous polyimide film can be increased.

For example, in the process of obtaining a coating film containing a polyimide precursor and organic particles and then drying the coating film to form a film containing the polyimide precursor and organic particles, as described above, the polyimide precursor is in a state where the polyimide precursor can be dissolved in a solvent in the film. In a case where the film is in this state, the organic particles may be exposed by, for example, a wiping process or a process of immersing the organic particles in a solvent. Specifically, the polyimide precursor solution existing in the region of equal to or more than the thickness of the particle layer is removed by, for example, wiping the polyimide precursor solution existing in the region of equal to or more than the thickness of the particle layer with a solvent to expose the particle layer. Then, the organic particles existing in the upper region of the particle layer (that is, the region on the side of the particle layer away from the substrate) are exposed from the surface of the film.

In the second step, the substrate for forming the above-mentioned film used in the first step may be peeled off when the film becomes dry, may be peeled off when the polyimide precursor in the polyimide film becomes difficult to dissolve in the organic solvent, and may be peeled off when imidization is completed and the film is formed.

Through the above steps, a porous polyimide film is obtained. Then, the porous polyimide film may be post-processed.

Here, the imidization rate of the polyimide precursor will be described.

Examples of the partially imidized polyimide precursor include precursors having a structure having a repeating unit represented by General Formula (V-1), General Formula (V-2), and General Formula (V-3).

[Chem. 2]

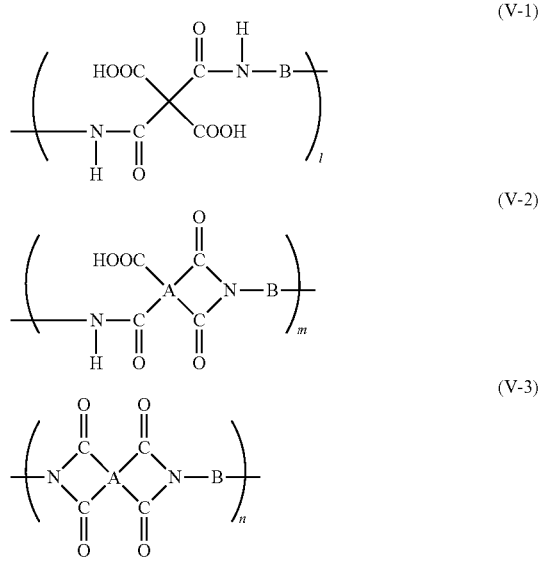

In General Formula (V-1), General Formula (V-2), and General Formula (V-3), A and B are synonymous with A and B n General Formula (I). 1 represents an integer of equal to or more than 1, and m and n each independently represent 0 or an integer of equal to or more than 1.

The imidization rate of the polyimide precursor represents the ratio of the number of imide-ring closure bonds (2n+m) to the total number of bonds (2l+2m+2n) in the bonds of the polyimide precursor (reaction portion of tetracarboxylic dianhydride and diamine compound). That is, the imidization rate of the polyimide precursor is represented by "(2n+m)/(2l+2m+2n)".

The imidization rate (value of "(2n+m)/(2l+2m+2n)") of the polyimide precursor is measured by the following method.

Measurement of Imidization Rate of Polyimide Precursor

Preparation of Polyimide Precursor Sample (i) The polyimide precursor solution to be measured is applied onto a silicon wafer in a film thickness range of equal to or more than 1 μm and equal to or less than 10 μm to prepare a coating film sample.

(ii) The coating film sample is immersed in tetrahydrofuran (THF) for 20 minutes to replace the solvent in the coating film sample with tetrahydrofuran (THF). The solvent to be immersed is not limited to THF, and is selected from a solvent that does not dissolve the polyimide precursor and can be miscible with the solvent component contained in the polyimide precursor solution. Specifically, alcohol solvents such as methanol and ethanol, and ether compounds such as dioxane are used.

(iii) The coating film sample is taken out from the THF, and $N_2$ gas is blown to the THF adhered to the surface of the coating film sample to remove THF. Under a reduced pressure of equal to or less than 10 mmHg, the coating film sample is dried for 12 hours or more in the range of equal to or higher than 5° C. and equal to or lower than 25° C. to prepare a polyimide precursor sample.

Preparation of 100% Imidized Standard Sample (iv) In the same manner as in (i) above, the polyimide precursor solution to be measured is applied onto a silicon wafer to prepare a coating film sample.

(v) The coating film sample is heated at 380° C. for 60 minutes to perform an imidization reaction to prepare a 100% imidized standard sample.

Measurement and Analysis (vi) Using a Fourier transform infrared spectrophotometer (FT-730 manufactured by Horiba Seisakusho), the infrared absorption spectra of the 100% imidized standard sample and the polyimide precursor sample are measured. The ratio I'(100) of the absorption peak derived from the imide bond near 1780 cm$^{-1}$ (Ab' (1780 cm$^{-1}$)) to the absorption peak derived from the aromatic ring near 1500 cm$^{-1}$ (Ab' (1500 cm$^{-1}$)) of the 100% imidized standard sample is determined.

(vii) Similarly, the polyimide precursor sample is measured, and the ratio I(x) of the absorption peak derived from the imide bond near 1780 cm$^{-1}$ (Ab(1780 cm$^{-1}$)) to the absorption peak derived from the aromatic ring near 1500 cm$^{-1}$ (Ab(1500 cm$^{-1}$)) is determined.

Then, the measured absorption peaks I'(100) and I(x) are used to calculate the imidization rate of the polyimide precursor based on the following formula.

imidization rate of polyimide precursor=$I(x)/I'(100)$     Formula:

$I'(100)=(Ab'(1780\ cm^{-1}))/(Ab'(1500\ cm^{-1}))$     Formula:

$I(x)=(Ab(1780\ cm^{-1}))/(Ab(1500\ cm^{-1}))$     Formula:

The measurement of the imidization rate of this polyimide precursor is applied to the measurement of the imidization rate of the aromatic polyimide precursor. In the case of measuring the imidization rate of the aliphatic polyimide precursor, a peak derived from a structure that does not change before and after the imidization reaction is used as an internal standard peak instead of the absorption peak of the aromatic ring.

Porous Polyimide Film

Hereinafter, the porous polyimide film of the present exemplary embodiment will be described.

The porous polyimide film of the present exemplary embodiment is produced, for example, by the method for producing a porous polyimide film using the polyimide precursor solution according to the present exemplary embodiment.

Specifically, the porous polyimide film according to the present exemplary embodiment is formed of a polyimide film having pores with a pore size of equal to or less than 100 nm and a glass transition temperature Tg of equal to or higher than 300° C., the air permeability of the porous polyimide film after heat treatment at 250° C. is equal to or less than 700 (sec/100 mL), and the air permeability of the film after heat treatment at 400° C. is equal to or more than 3,600 (sec/100 mL).

The porous polyimide film according to the present exemplary embodiment has the above-mentioned properties, and thus becomes a porous polyimide film that has sufficient breathability and high heat resistance, and becomes non-breathable or has reduced breathability when the temperature becomes high.

A pore size of the porous polyimide film according to the present exemplary embodiment is equal to or less than 100 nm, for example, more preferably equal to or less than 95 nm, and still more preferably equal to or less than 90 nm.

However, a lower limit of the volume average particle size of the resin particles may be, for example, equal to or more than 40 nm from the viewpoint of ensuring the breathability of the porous polyimide film and manufacturing.

In a case where the pore size of the porous polyimide film is set to the above range, a porous polyimide film in which the partition wall between the pores is plastically deformed or melted when the temperature becomes high, and that becomes non-breathable or has reduced breathability when the temperature becomes high may be obtained while ensuring the breathability of the obtained porous polyimide film.

The porous polyimide film is not particularly limited, but the porosity may be equal to or more than 30%. In addition, the porosity is, for example, preferably equal to or more than 40%, and more preferably equal to or more than 50%. The upper limit of the porosity is not particularly limited, and the porosity may be in the range of equal to or less than 90%.

The shape of the pores is, for example, a spherical shape or a shape close to a spherical shape.

Specifically, the ratio of the maximum diameter to the minimum diameter of the pores (the ratio of the maximum value to the minimum value of the pore size) is, for example, preferably equal to or more than 1 and equal to or less than 2, more preferably equal to or more than 1 and equal to or less than 1.9, and still more preferably equal to or more than 1 and equal to or less than 1.8. Within this range, the ratio is, for example, more preferably close to 1. Within this range, variation in pore size is suppressed. In addition, in a case where the porous polyimide film of the present exemplary embodiment is, for example, applied to a separator for a secondary battery, the occurrence of turbulence in the ion flow is suppressed, and thus the formation of lithium dendrite is likely to be suppressed. The "ratio of the maximum diameter to the minimum diameter of the pores" is a ratio expressed by a value obtained by dividing the maximum diameter of the pores by the minimum diameter (that is, the maximum value/the minimum value of the pore size).

The pore size and the ratio of the maximum diameter to the minimum diameter of the pores are values observed and measured by a scanning electron microscope (SEM). Specifically, first, a porous polyimide film is cut out and a sample for measurement is prepared. Then, the sample for measurement is observed and measured by VE SEM manufactured by KEYENCE Corporation using image processing software provided as a standard. Observation and measurement are performed on 100 pieces of each of the pores in the cross section of the sample for measurement, and the average value, the minimum diameter, the maximum diameter, and the arithmetic mean diameter of each of the pores are obtained. In a case where the shape of the pores is not circular, the longest portion is defined as the diameter.

A film thickness of the porous polyimide film is not particularly limited, but may be equal to or more than 15 μm and equal to or less than 500 μm.

The film thickness of the porous polyimide film is measured in an environment of 23° C.±1° C. using a length measuring device (manufactured by Tokyo Seimitsu Co., Ltd., high-precision digital length measuring device MINIAX PH-13 and the company's display unit DH-150).

The air permeability of the porous polyimide film according to the present exemplary embodiment after heat treatment at 250° C. is equal to or less than 700 (sec/100 mL), but from the viewpoint of ensuring sufficient breathability, the air permeability is, for example, preferably equal to or less than 500 (sec/100 mL), more preferably equal to or less than 400 (sec/100 mL), and still more preferably equal to or less than 300 (sec/100 mL).

The air permeability of the porous polyimide film of the present exemplary embodiment after heat treatment at 400° C. is equal to or more than 3,600 (sec/100 mL). In a case where the air permeability is equal to or more than 3,600 (sec/100 mL), the polyimide film is considered to have no breathability.

The air permeability of the porous polyimide film is measured by a Gurley method based on the air permeability test method of JIS P 8117: 2009.

Applications of Porous Polyimide Film

Examples of applications to which the porous polyimide film according to the present exemplary embodiment is applied include a separator for a secondary battery such as a lithium battery; a separator for an electrolytic capacitor; an electrolyte membrane such as a fuel cell; a battery electrode material; a separation membrane of gas or liquid; a low dielectric constant material; a filtration membrane; and the like.

In particular, since the porous polyimide film according to the present exemplary embodiment has a shutdown function, it can be appropriately applied as a separator for a secondary battery.

Secondary Battery

The secondary battery according to the present exemplary embodiment includes the porous polyimide film according to the present exemplary embodiment as a separator for the secondary battery.

Lithium Ion Secondary Battery

A lithium ion secondary battery provided with the porous polyimide film according to the present exemplary embodiment as a separator for a lithium ion secondary battery will be described with reference to FIG. 2.

Figure 2:
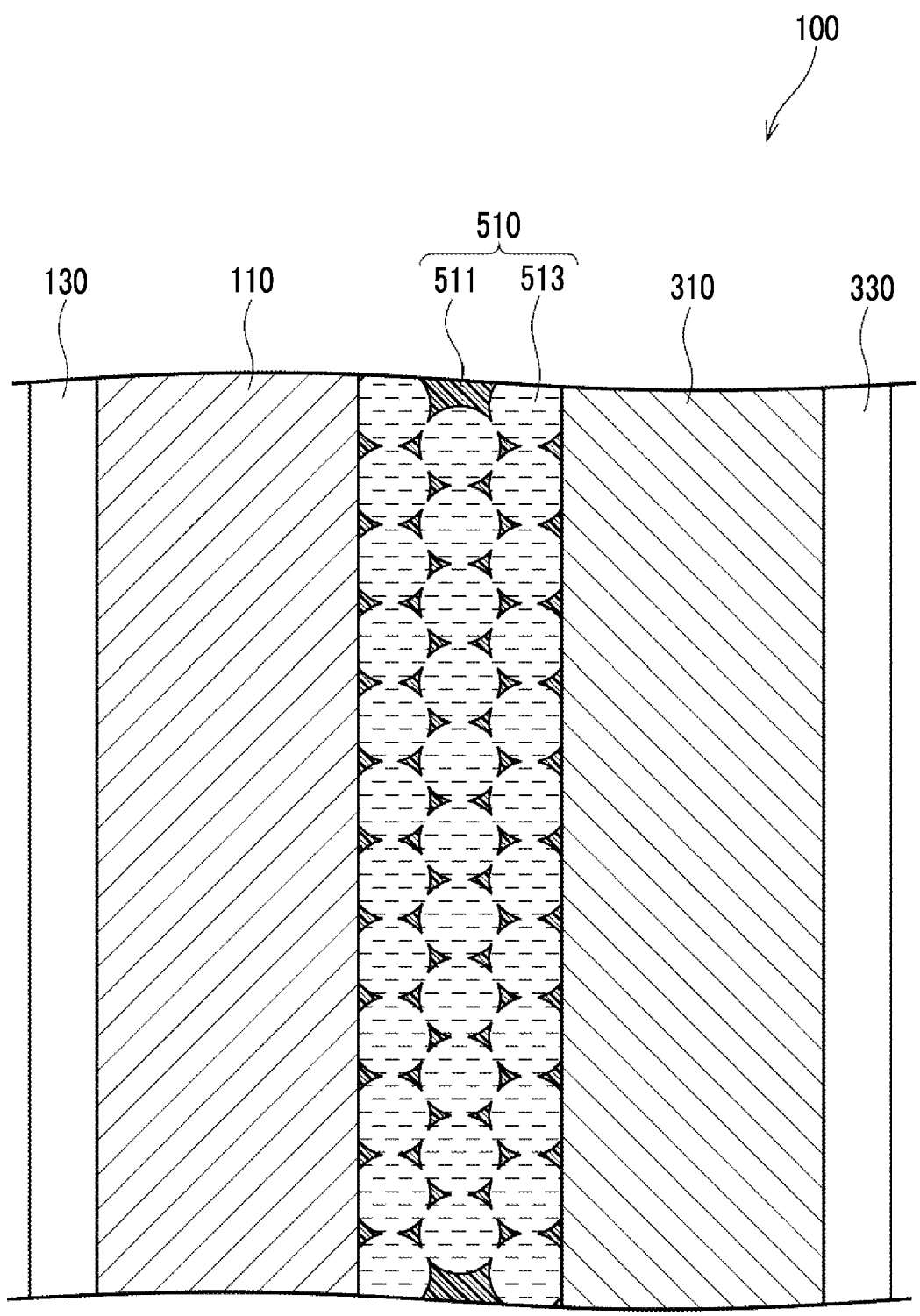
FIG. 2 is a schematic partial cross-sectional view showing an example of a lithium ion secondary battery provided with the porous polyimide film according to the present exemplary embodiment as a separator for a lithium ion secondary battery.

FIG. 2 is a schematic partial cross-sectional view showing an example of a lithium ion secondary battery to which a separator for a lithium ion secondary battery is applied.

As shown in FIG. 2, a lithium ion secondary battery 100 includes a positive electrode active material layer 110, a separator layer 510, and a negative electrode active material layer 310, housed inside an exterior member (not shown). The positive electrode active material layer 110 is provided on a positive electrode current collector 130, and the negative electrode active material layer 310 is provided on a negative electrode current collector 330. A separator layer 510 is provided so as to separate the positive electrode active material layer 110 and the negative electrode active material layer 310, and is arranged between the positive electrode active material layer 110 and the negative electrode active material layer 310 so that the positive electrode active material layer 110 and the negative electrode active material layer 310 face each other. The separator layer 510 includes a separator 511 and an electrolytic solution 513 filled inside the pores of the separator 511. The porous polyimide film according to the present exemplary embodiment is applied to the separator 511. The positive electrode current collector 130 and the negative electrode current collector 330 are members provided as needed.

Positive Electrode Current Collector 130 and Negative Electrode Current Collector 330

The material used for the positive electrode current collector 130 and the negative electrode current collector 330 is not particularly limited, and any known conductive material may be used. For example, metals such as aluminum, copper, nickel, and titanium can be used.

Positive Electrode Active Material Layer 110

The positive electrode active material layer 110 is a layer containing a positive electrode active material. Depending on the necessity, known additives such as a conductive auxiliary agent and a binder resin may be contained. The positive electrode active material is not particularly limited, and a known positive electrode active material is used. Examples thereof include lithium-containing composite oxides ($LiCoO_2$, $LiNiO_2$, $LiMnO_2$, $LiMn_2O_4$, $LiFeMnO_4$, $LiV_2O_5$, and the like), lithium-containing phosphates ($LiFePO_4$, $LiCoPO_4$, $LiMnPO_4$, $LiNiPO_4$, and the like) conductive polymers (polyacetylene, polyaniline, polypyrrole, polythiophene, and the like), and the like. These positive electrode active materials may be used alone or in combination of two or more kinds thereof.

Negative Electrode Active Material Layer 310

The negative electrode active material layer 310 is a layer containing a negative electrode active material. Depending on the necessity, a known additive such as a binder resin may be contained. The negative electrode active material is not particularly limited, and a known negative electrode active material is used. Examples thereof include carbon materials (graphite (natural graphite, artificial graphite), carbon nanotubes, graphitized carbon, low temperature fired carbon, and the like), metals (aluminum, silicon, zirconium, titanium, and the like), metal oxides (tin dioxide, lithium titanate, and the like), and the like. These negative electrode materials may be used alone or in combination of two or more kinds thereof.

Electrolytic Solution 513

As the electrolytic solution 513, for example, a non-aqueous electrolyte solution containing an electrolyte and a non-aqueous solvent can be exemplified.

Examples of the electrolyte include electrolytes of lithium salt ($LiPF_6$, $LiBF_4$, $LiSbF_6$, $LiAsF_6$, $LiClO_4$, $LiN(FSO_2)_2$, $LiN(CF_3SO_2)_2$, $LiN(C_2F_5SO_2)$, $LiC(CF_3SO_2)_3$, and the like). These electrolytes may be used alone or in combination of two or more kinds thereof.

Examples of the non-aqueous solvent include cyclic carbonates (ethylene carbonate, propylene carbonate, butylene carbonate, and the like), chain carbonates (diethyl carbonate, dimethyl carbonate, ethylmethyl carbonate, methyl acetate, ethyl acetate, methyl propionate, ethyl propionate, γ-butyrolactone, 1,2-dimethoxyethane, 1,2-diethoxyethane, and the like), and the like. These non-aqueous solvents may be used alone or in combination of two or more kinds thereof.

Method for Producing Lithium Ion Secondary Battery 100

An example of a method for producing a lithium ion secondary battery 100 will be described.

a coating liquid for forming a positive electrode active material layer 110 containing a positive electrode active material is applied to and dried on a positive electrode current collector 130 to obtain a positive electrode including the positive electrode active material layer 110 provided on the positive electrode current collector 130.

Similarly, a coating liquid for forming a negative electrode active material layer 310 containing a negative electrode active material is applied to and dried on a negative electrode current collector 330 to obtain a negative electrode including the negative electrode active material layer 310 provided on the negative electrode current collector 330. The positive electrode and the negative electrode may be compressed, depending on the necessity.

Next, a separator 511 is arranged between the positive electrode active material layer 110 of the positive electrode and the negative electrode active material layer 310 of the negative electrode so that the positive electrode active material layer 110 of the positive electrode and the negative electrode active material layer 310 of the negative electrode face each other, and a laminated structure body is obtained. In the laminated structure body, a positive electrode (positive electrode current collector 130, positive electrode active material layer 110), a separator layer 510, and a negative electrode (negative electrode active material layer 310, negative electrode current collector 330) are laminated in this order. At this time, compression processing may be performed depending on the necessity.

Next, after housing the laminated structure body in an exterior member, the electrolytic solution 513 is injected into the inside of the laminated structure body. The injected electrolytic solution 513 also penetrates into the pores of the separator 511.

In this way, the lithium ion secondary battery 100 is obtained.

EXAMPLES

Examples will be described below, but the present invention is not limited to these examples. In the following description, all "parts" and "%" are based on mass, unless otherwise specified.

Example 1

Production of Resin Particle Dispersion 125 g of styrene as a monomer 1, 10.6 g of Dowfax 2A-1 (47% aqueous solution), and 327 g of ion-exchanged water are mixed and heated to 70° C. under a nitrogen stream to prepare a monomer 1-containing solution. 0.4 g of ammonium persulfate is dissolved in 4 g of ion-exchanged water. The obtained solution is added dropwise to the monomer 1-containing solution over 5 minutes. Then, a monomer 2-containing solution prepared by dissolving 4.8 g of methacrylic acid as the monomer 2 in 12 g of ion-exchanged water is added dropwise to the monomer 1-containing aqueous solution over 30 minutes. Two hours after the completion of the dropping, a solution prepared by dissolving 0.7 g of ammonium persulfate in 7 g of ion-exchanged water is added to the obtained solution, and the mixture is further heated for two hours. Then, heating and concentration is performed at 75° C. under a nitrogen stream to obtain a resin particle dispersion 1. A volume average particle size (D50) of the resin particles is 72 nm, and the concentration is 30.0%.

Production of Polyimide Precursor Solution 390.7 g of ion-exchanged water is heated to 50° C. under a nitrogen stream, and 19.35 g (178.9 mmol) of p-phenylenediamine (PDA) and 52.65 g (178.9 mmol) of 3,3', 4,4'-biphthalic acid dianhydride (BPDA) are added thereto while stirring. A mixture solution of 54.3 g (536 mmol) of N-methylmorpholine (MMO), 37.8 g of N-methyl-2-pyrrolidone (NMP), and 45.2 g of ion-exchanged water is added dropwise under a nitrogen stream at 50° C. for 20 minutes while stirring. Reaction is further performed at 50° C. for 15 hours to obtain a 12% polyimide precursor solution.

Production of Particle-Containing Polyimide Precursor Solution

The resin particle dispersion, the polyimide precursor solution, and the ion-exchanged water are mixed so as to have the composition shown in Table 1, heated to 50° C., and then dispersed using Awatori Rentaro ARE-310 (manufactured by Thinky Corporation) to obtain a particle-containing polyimide precursor solution 1.

Examples 1 to 9 and Comparative Examples 1 to 4

A particle-containing polyimide precursor solution is obtained in the same manner as in Example 1 except that the type of the polyimide precursor and the type of the resin particles are changed according to Table 1.

The abbreviations in Table 1 are as follows.

BPDA: 3,3',4,4'-biphthalic acid dianhydride
BTDA: 3,3',4,4'-benzophenonetetracarboxylic dianhydride
PDA: p-phenylenediamine
ODA: 3,3',4,4'-benzophenonetetracarboxylic dianhydride
NMP: N-methyl-2-pyrrolidone
MMO: N-methylmorpholine Properties/Evaluation The particle-containing polyimide precursor solution of each example heated to 50° C. is applied onto a glass substrate using an applicator by adjusting a gap of the applicator so that a film thickness after film formation is 20 μm. The resultant product is dried in an oven at 80° C. for 40 minutes and then baked at 250° C. for 16 hours. After allowing to cool to room temperature, the resin particles are removed by immersing in tetrahydrofuran for 30 minutes. After removing the resin particles, the resultant product is immersed in ion-exchanged water for 10 minutes and peeled off from a glass substrate. After peeling, the resultant product is washed with tetrahydrofuran and air-dried to obtain a porous polyimide film.

The following properties of the obtained porous polyimide film are measured according to the method described above.

Glass transition temperature of polyimide
Pore size
Air permeability

In a case where the air permeability of the film after heat treatment at 400° C. is equal to or more than 3,600 (sec/100 mL), it is determined that the film is not breathable.

In addition, the heat resistance of the obtained porous polyimide film is evaluated as follows.

The obtained porous polyimide film is heat-treated in an oven at 250° C. for 1 hour. The air permeability before the heat treatment is set as T0, the air permeability after the treatment is set as T1, and the evaluation is performed as T1/T0. The evaluation criteria are as follows.

A: T1/T0 is less than 2.0
B: T1/T0 is equal to or more than 2.0 and less than 5.0
C: T1/T0 is equal to or more than 5.0 and less than 10.0
D: T1/T0 is equal to or more than 10.0
E: T1 is equal to or more than 3,600

Regarding the evaluation of heat resistance, Comparative Examples 1 to 3 are omitted since it is determined that the film is not breathable in a case where the air permeability of the film after heat treatment at 400° C. is equal to or more than 3,600 (sec/100 mL).

TABLE 1

| | | | | Example1 | Example2 | Example3 | Example4 | Example5 |
|---|---|---|---|---|---|---|---|---|
| Polyimide precursor solution | Polyimide precursor | Tetracarboxylic dianhydride | BPDA/molar ratio (to entire anhydride) | 100 | 100 | 100 | 100 | 100 |
| | | | BTDA/molar ratio (to entire anhydride) | — | — | — | — | — |
| | | Diamine compound | PDA/molar ratio (to entire diamine) | 100 | 100 | 100 | 100 | 100 |
| | | | ODA/molar ratio (to entire diamine) | — | — | — | — | — |
| | | Concentration (mass % to precursor solution) | | 5.28% | 5.28% | 5.28% | 5.28% | 5.28% |
| | Aqueous solvent | Solvent 1: type/mass % (to precursor solution) | | Water/ 77.5 | Water/ 77.5 | Water/ 77.5 | Water/ 77.5 | Water/ 77.5 |
| | | Solvent 2: type/mass % (to precursor solution) | | NMP/ 2.64 | NMP/ 2.64 | NMP/ 2.64 | NMP/ 2.64 | NMP/ 2.64 |
| | Organic amine compound | Type | | MMO | MMO | MMO | MMO | MMO |
| | Resin particles | Monomer 1 | | Styrene | Styrene | Styrene | Styrene | Styrene |
| | | Monomer 2 | | Methacrylic acid | Methacrylic acid | Methacrylic acid | Methacrylic acid | — |
| | | Volume average particle size D50 (nm) | | 72 nm | 94 nm | 73 nm | 65 nm | 71 nm |
| | | Weight average molecular weight | | 380,000 | 420,000 | 220,000 | 620,000 | 340,000 |
| | | Concentration (mass % = particle/ particle-containing polyimide precursor solution) | | 10.72% | 10.72% | 10.72% | 10.72% | 10.72% |
| | | Concentration (volume % = particle/ solid content) | | 74% | 74% | 74% | 74% | 74% |
| Porous polyimide film | Properties/ evaluation | Glass transition temperature (° C.) of polyimide | | 335 | 336 | 337 | 334 | 333 |
| | | Pore size (nm) | | 75 | 92 | 70 | 68 | 98 |
| | | Breathability (sec/100 mL) | After film formation | 218 | 137 | 531 | 254 | 112 |

TABLE 1-continued

| | | | | Example 6 | Example 7 | Example 8 | Example 9 |
|---|---|---|---|---|---|---|---|
| | | Heat treatment at 250° C. | | 236 | 141 | 670 | 251 | 451 |
| | | Heat treatment at 400° C. | | Not airpermeable | Not airpermeable | Not airpermeable | Not airpermeable | Not airpermeable |
| | | Heat resistance | | A | A | A | A | C |

| | | | | Example 6 | Example 7 | Example 8 | Example 9 |
|---|---|---|---|---|---|---|---|
| Polyimide precursor solution | Polyimide precursor | Tetracarboxylic dianhydride | BPDA/molar ratio (to entire anhydride) | 100 | 100 | 100 | 80 |
| | | | BTDA/molar ratio (to entire anhydride) | — | — | — | 20 |
| | | Diamine compound | PDA/molar ratio (to entire diamine) | 100 | 100 | 100 | 80 |
| | | | ODA/molar ratio (to entire diamine) | — | — | — | — |
| | | Concentration (mass % to precursor solution) | | 7.72% | 8.54% | 7.72% | 7.72% |
| | Aqueous solvent | Solvent 1: type/mass % (to precursor solution) | | Water/ 74.4 | Water/ 73.4 | Water/ 77.5 | Water/ 77.5 |
| | | Solvent 2: type/mass % (to precursor solution) | | NMP/ 3.86 | NMP/ 4.27 | NMP/ 2.64 | NMP/ 2.64 |
| | Organic amine compound | Type | | MMO | MMO | MMO | MMO |
| | Resin particles | Monomer 1 | | Styrene | Styrene | Styrene | Styrene |
| | | Monomer 2 | | Methacrylic acid | Methacrylic acid | Methacrylic acid | Methacrylic acid |
| | | Volume average particle size D50 (nm) | | 72 nm | 72 nm | 72 nm | 72 nm |
| | | Weight average molecular weight | | 380,000 | 380,000 | 900,000 | 380,000 |
| | | Concentration (mass % = particle/ particle-containing polyimide precursor solution) | | 8.28% | 7.46% | 10.72% | 10.72% |
| | | Concentration (volume % = particle/ solid content) | | 60% | 55% | 74% | 74% |
| Porous polyimide film | Properties/ evaluation | Glass transition temperature (° C.) of polyimide | | 336 | 339 | 337 | 310 |
| | | Pore size (nm) | | 78 | 81 | 72 | 53 |
| | | Breathability (sec/100 mL) | After film formation | 311 | 421 | 301 | 310 |
| | | | Heat treatment at 250° C. | 313 | 420 | 311 | 660 |
| | | | Heat treatment at 400° C. | Not airpermeable | Not airpermeable | Not airpermeable | Not airpermeable |
| | | Heat resistance | | A | A | A | B |

| | | | | Comparative Example 1 | Comparative Example 2 | Comparative Example 3 | Comparative Example 4 |
|---|---|---|---|---|---|---|---|
| | Polyimide precursor solution | Polyimide precursor | Tetracarboxylic dianhydride | BPDA/molar ratio (to entire anhydride) | 100 | 100 | 100 | 70 |
| | | | | BTDA/molar ratio (to entire anhydride) | — | — | — | 30 |

TABLE 1-continued

|  |  |  |  |  |  |  |  |
|---|---|---|---|---|---|---|---|
|  |  | Diamine compound | PDA/molar ratio (to entire diamine) |  | 100 | 100 | 100 | 60 |
|  |  |  | ODA/molar ratio (to entire diamine) |  | — | — | — | — |
|  |  |  | Concentration (mass % to precursor solution) |  | 7.72% | 7.72% | 7.72% | 7.72% |
|  | Aqueous solvent | Solvent 1: type/mass % (to precursor solution) |  | Water/ 77.5 | Water/ 77.5 | Water/ 77.5 | Water/ 77.5 |
|  |  | Solvent 2: type/mass % (to precursor solution) |  | NMP/ 2.64 | NMP/ 2.64 | NMP/ 2.64 | NMP/ 2.64 |
|  | Organic amine compound | Type |  | MMO | MMO | MMO | MMO |
|  | Resin particles | Monomer 1 |  | Styrene | Styrene | Styrene | Styrene |
|  |  | Monomer 2 |  | Methacrylic acid | Methacrylic acid | Methacrylic acid | Methacrylic acid |
|  |  | Volume average particle size D50 (nm) |  | 194 nm | 384 nm | 816 nm | 72 nm |
|  |  | Weight average molecular weight |  | 360,000 | 350,000 | 490,000 | 380,000 |
|  |  | Concentration (mass % = particle/ particle-containing polyimide precursor solution) |  | 10.72% | 10.72% | 10.72% | 10.72% |
|  |  | Concentration (volume % = particle/ solid content) |  | 74% | 74% | 74% | 74% |
| Porous polyimide film | Properties/ evaluation | Glass transition temperature (° C.) of polyimide |  | 335 | 336 | 337 | 295 |
|  |  | Pore size (nm) |  | 191 | 390 | 831 | 46 |
|  |  | Breathability (sec/100 mL) | After film formation | 37 | 23 | 11 | Not airpermeable |
|  |  |  | Heat treatment at 250° C. | 36 | 24 | 10 | Not airpermeable |
|  |  |  | Heat treatment at 400° C. | 41 | 24 | 12 | Not airpermeable |
|  |  | Heat resistance |  | — | — | — | E |

From the above results, it is recognized that the polyimide precursor solution of the present example obtains a porous polyimide film having sufficient breathability and high heat resistance, and becoming non-breathable or having reduced breathability when the temperature becomes high, compared with the polyimide precursor solutions of Comparative Examples 1 to 3.

With this, it is recognized that the polyimide precursor solution of the present example obtains a porous polyimide film having a shutdown function appropriate for a separator for a secondary battery.

In Example 5, pinholes (holes of equal to or less than 1 mm) are formed due to aggregation of the resin particles, and film defects are generated. There are no pinholes in other examples.

In addition, in Comparative Example 4, it is recognized that the obtained porous polyimide film becomes non-breathable or has reduced breathability when the temperature becomes high, but has low heat resistance.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A polyimide precursor solution comprising:
   a polyimide precursor having a glass transition temperature Tg of equal to or higher than 300° C. after imidization;
   an aqueous solvent containing water;
   an organic amine compound; and
   resin particles having a volume average particle size of 40 nm or more and 95 nm or less.

2. The polyimide precursor solution according to claim 1, wherein the polyimide precursor is a polymer of an aromatic tetracarboxylic dianhydride and an aromatic diamine compound.

3. The polyimide precursor solution according to claim 2, wherein the aromatic tetracarboxylic dianhydride contains equal to or more than 80 mol % of biphenyltetracarboxylic dianhydride, and
   the aromatic diamine compound contains equal to or more than 80 mol % of p-phenylenediamine.

4. The polyimide precursor solution according to claim 1, wherein a weight average molecular weight of the resin particles is equal to or more than 200,000.

5. The polyimide precursor solution according to claim 2, wherein the weight average molecular weight of the resin particles is equal to or more than 200,000.

6. The polyimide precursor solution according to claim 3, wherein the weight average molecular weight of the resin particles is equal to or more than 200,000.

7. The polyimide precursor solution according to claim 4, wherein the weight average molecular weight of the resin particles is equal to or more than 300,000.

8. The polyimide precursor solution according to claim 5, wherein the weight average molecular weight of the resin particles is equal to or more than 300,000.

9. The polyimide precursor solution according to claim 6, wherein the weight average molecular weight of the resin particles is equal to or more than 300,000.

10. The polyimide precursor solution according to claim 1, wherein each of the resin particles has a carboxy group on a surface of the resin particle.

11. The polyimide precursor solution according to claim 2, further comprising:
a carboxy group on a surface of the resin particle.

12. The polyimide precursor solution according to claim 3, further comprising:
a carboxy group on a surface of the resin particle.

13. The polyimide precursor solution according to claim 4, further comprising:
a carboxy group on a surface of the resin particle.

14. The polyimide precursor solution according to claim 5, further comprising:
a carboxy group on a surface of the resin particle.

15. The polyimide precursor solution according to claim 6, further comprising:
a carboxy group on a surface of the resin particle.

16. The polyimide precursor solution according to claim 7, further comprising:
a carboxy group on a surface of the resin particle.

17. The polyimide precursor solution according to claim 8, further comprising:
a carboxy group on a surface of the resin particle.

* * * * *